J. VOLLMER.
FRICTIONAL CLUTCH OR COUPLING.
APPLICATION FILED JAN. 5, 1907.
969,577.
Patented Sept. 6, 1910.
3 SHEETS—SHEET 3.
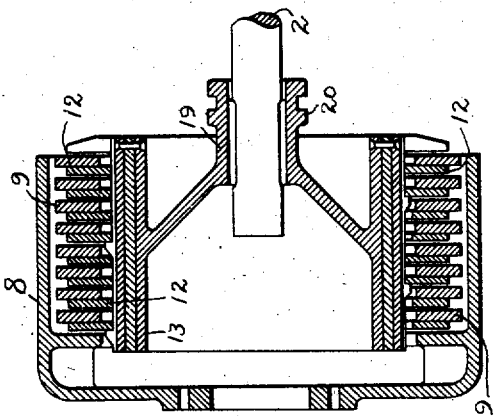
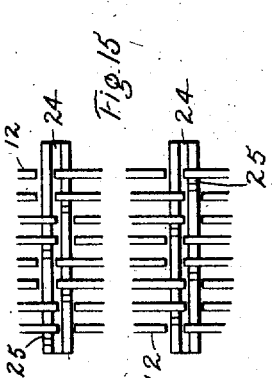
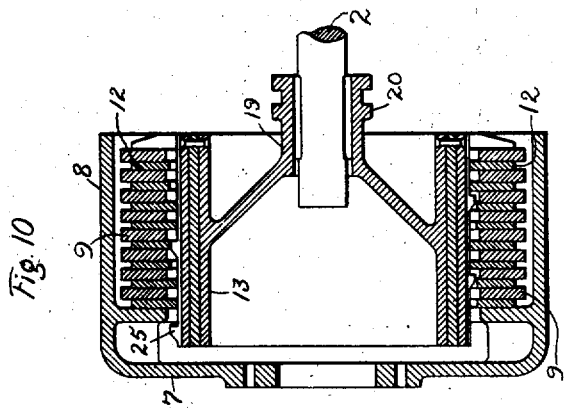
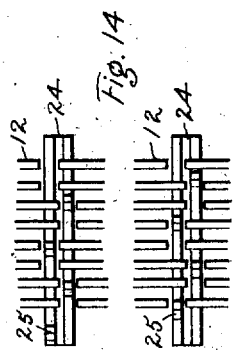
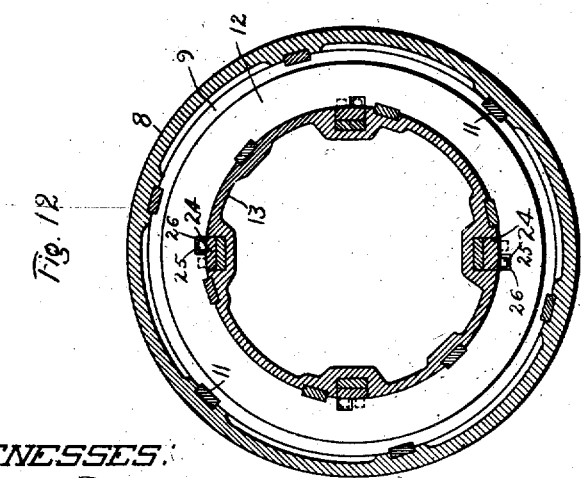
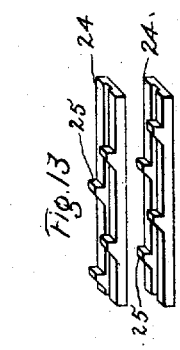
WITNESSES
INVENTOR
JOSEPH VOLLMER.
BY
ATT'Y.

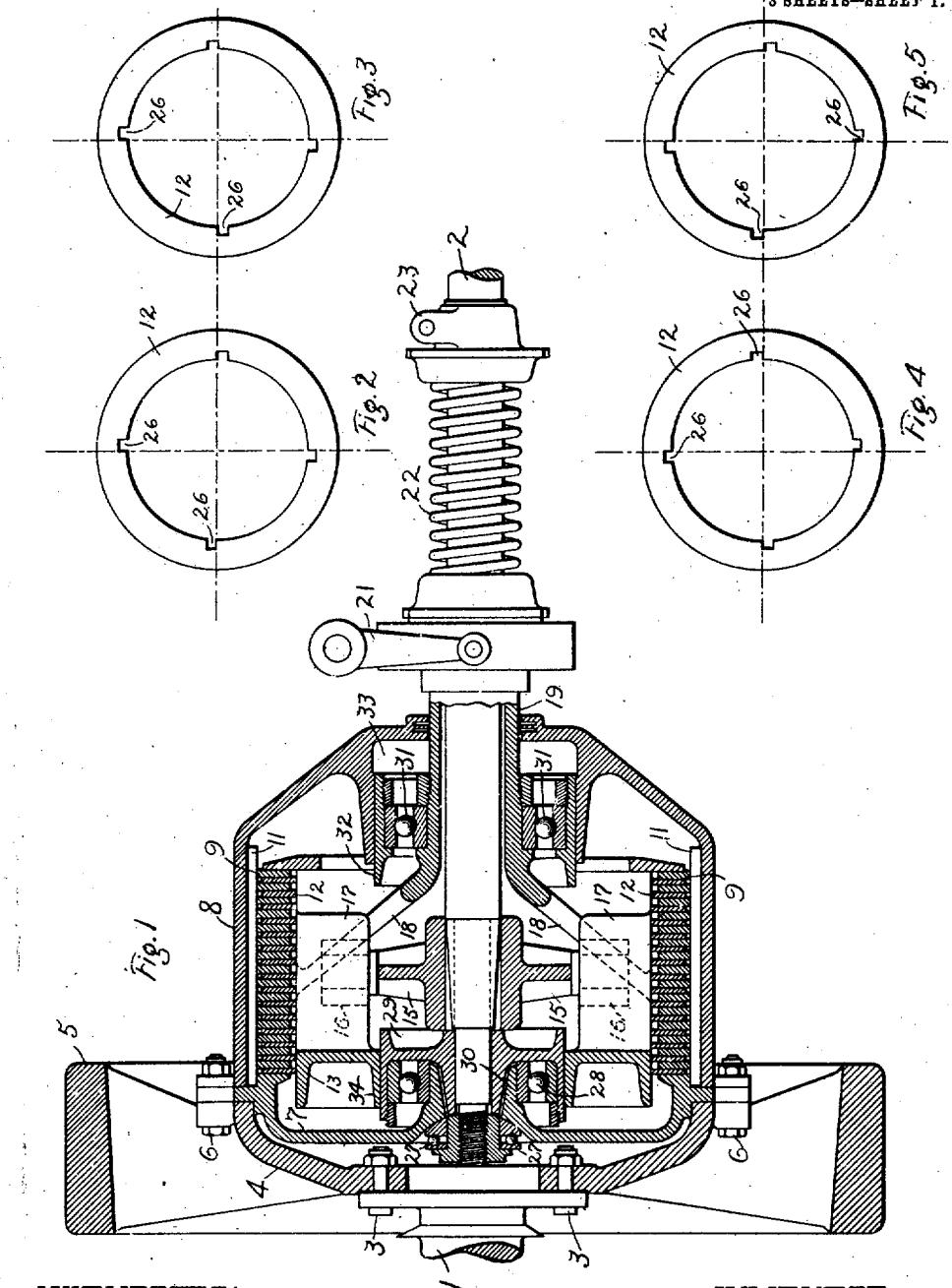

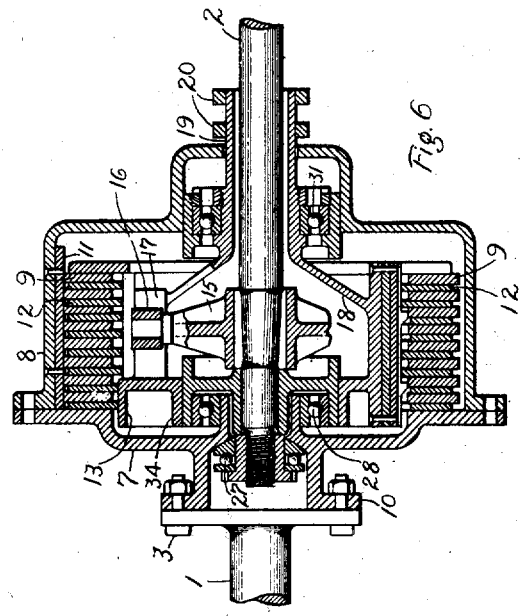
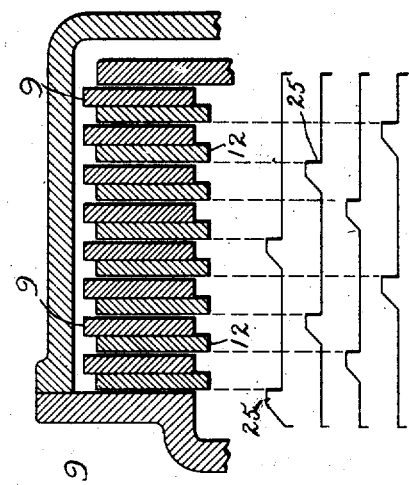
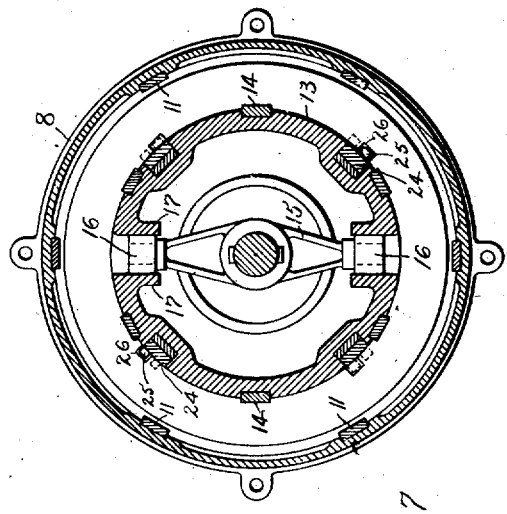
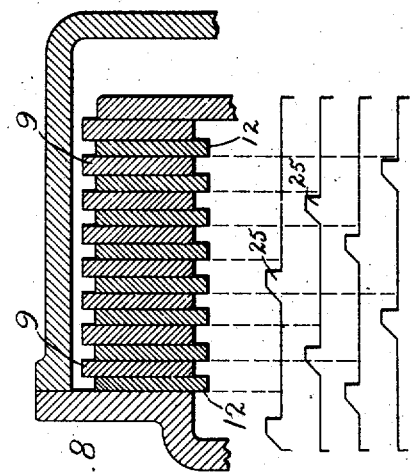

UNITED STATES PATENT OFFICE.

JOSEPH VOLLMER, OF BERLIN, GERMANY, ASSIGNOR TO GENERAL ELECTRIC COMPANY, A CORPORATION OF NEW YORK.

FRICTIONAL CLUTCH OR COUPLING.

969,577.
Specification of Letters Patent.
Patented Sept. 6, 1910.

Application filed January 5, 1907. Serial No. 350,933.

*To all whom it may concern:*

Be it known that I, JOSEPH VOLLMER, a subject of the Grand Duke of Baden, Germany, residing at Berlin, Germany, have invented certain new and useful Improvements in Frictional Clutches or Couplings, of which the following is a specification.

My invention relates to frictional clutches or couplings, and its object is to improve their construction and operation as set forth more particularly in the following description and claims.

In the accompanying drawings illustrating certain embodiments of my invention, Figure 1 is an axial section of one form of coupling; Figs. 2, 3, 4 and 5 show the arrangement of the openings in the clutch disks to permit the passage of certain of the disengaging members; Fig. 6 is an axial section of a slightly modified form of clutch; Fig. 7 is a transverse section of this type of clutch; Figs. 8 and 9 show the relation of the clutch disks and the disengaging members in the closed and open positions, respectively, of the clutch; Fig. 10 is an axial section of another modification showing the clutch in closed position; Fig. 11 is a similar section of the clutch in open position; Fig. 12 is a transverse section of the clutch shown in Figs. 10 and 11; Fig. 13 is a perspective view of the members which disengage the clutch disks; and Figs. 14 and 15 are diagrammatic views showing the relation of the disengaging members and the disks.

The clutch or coupling, as is customary, controls the transmission of motion between two shafts, 1 and 2, or other rotary members, one of which is the driving or actuating member and the other the driven member. Beyond the clutch, these members are supported by suitable bearings. In Fig. 1, the shaft 1 is attached by bolts 3, or equivalent means, to the web 4 which forms part of a fly wheel 5. The web 4 is secured by bolts 6 to the cylindrical parts 7, 8 which form an inclosing casing for the clutch members and also carry one set of clutch disks 9. The clutch shown in Fig. 6 has no fly-wheel attached and differs from that shown in Fig. 1 chiefly in the changes in the parts 7, 8 made necessary by the omission of the fly-wheel. Thus, a flanged projection 10 is formed on the member 7 to couple it directly to the shaft 1. The internal construction of the clutch is the same in both figures. The disks or rings 9 are caused to rotate with the casing by keys 11, Figs. 1 and 7, on which, however, the disks are free to slide axially. Another set of disks 12, located in the spaces between the disks 9 are keyed to a substantially cylindrical member 13, but are free to slide axially on their keys 14, Fig. 7. Arms 15 projecting from a hub secured to the shaft 2 carry rolls 16 at their outer ends which engage guides formed between ribs 17 on the member 13, thus transmitting motion from the shaft to that member, but permitting a relative axial movement between them. Arms 18 connect the outer portion of the member 13 with a sleeve 19 which surrounds the shaft 2 and projects through the casing 8. Considerable clearance is left between the inner surface of the sleeve and the shaft to allow the shaft to vibrate to a limited extent without imparting the vibration to the sleeve and casing. Such vibrations if transmitted to the parts 8 and 13 would tend to disturb the proper alinement of the clutch disks and impair the efficiency of the device by preventing contact over the entire surface of the disks. Vibrations of this sort often occur in motor vehicles due to lack of rigidity of the frame or chassis and in other structures which are not sufficiently rigid to maintain the alinement of the shafts and their bearings.

Beyond the casing, the sleeve is provided with suitable collars 20 to engage with an operating lever 21 which is connected with any appropriate form of control mechanism. A spring 22 abutting against a collar 23 fixed to the shaft 2 may be used to force the parts 8 and 13 and their disks into operative engagement, the lever moving the sleeve against the action of the spring when opening or disconnecting the clutch.

To insure a quick and positive separation of the disks when the clutch is opened, I provide toothed members 24, Fig. 13. These members are secured in grooves in the outer surface of the cylinder 13 to move with it under the influence of the lever 21. The teeth or projections 25 are so spaced relatively to the disks 12 when the clutch is closed, see Fig. 8, that on moving the lever 21 to release the pressure on the disks and open the clutch, they engage the disks in rapid succession, one after another beginning at the right as shown in said figure. Fig. 9 shows the positions to which the teeth and the disks are moved when the clutch is fully open. If the clutch were opened merely by releasing the pressure on the end of the series of disks, an instantaneous and sure release of the coupled shaft would not result because of the rubbing and heating of the relatively rotating rings or disks while under some pressure and the adhesion of oil between the disks.

In moving the required distance to engage with its disk, a tooth 25 may have to lie within or pass through intervening disks. As illustrated diagrammatically in Figs. 14 and 15, this mode of operation is made possible by cutting slots 26 in successive disks in staggered relation, as shown in Figs. 2 and 5, and placing the teeth in spaced rows, see Fig. 13. The slots 26 are made wider than the teeth 25 to permit a free passage of the latter.

The shaft 2 is held in proper relation to the part 7 of the casing by the ball bearings 27 and 28. The members of the ball bearing 27 are secured to the end of the shaft and the portion engaging the casing is of spherical shape to facilitate alinement of the parts of the clutch with the shaft. Between the bearing 27 and the hub of the arms 15, a cylindrical member 29 is fixed to the shaft 2 and carries one part of the bearing 28. The other part of the bearing is secured to the projection 30 on the casing 7. A ball bearing 31 at the other end of the coupling has one of its parts fixed on the sleeve 19 and its other part mounted in the cylindrical member 32 which rotates with the casing 7, 8, but has a sliding movement in the recess 33 in the part 8 of the casing. The ring 34 on the member 13 also slides on the cylindrical member 29. The ribs 17 permit the ends of the arms 15 to remain in driving position as the member 13 is moved longitudinally. When the clutch is opened and one member rotates with respect to the other, it rotates on the ball bearings between it and the other member.

Figs. 10, 11 and 12 show a simpler form of clutch which may be used for machines in which the framework and bearing are so rigid as to maintain the driving and driven shafts in substantial alinement. Vibration being eliminated or reduced to a minimum, the sleeve 19 may be splined to the shaft 2 and have a close sliding fit on the shaft.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In a friction clutch, the combination of driving and driven members movable axially with respect to each other, and series of interlapping disks on said members, with means for moving the members relatively to each other to press one series into driving engagement with the other and for imparting an opposite movement to release the pressed disks from driving relation, and radially projecting devices fixedly mounted on one of the members which move each disk of one series away from an adjacent disk of the other series during said releasing movement.

2. In a friction clutch, the combination of cylindrical driving and driven members having series of annular interlapping friction disks of different diameters mounted thereon so that the disks of one series project inwardly beyond those of the other series, and means for opening and closing the clutch including devices projecting radially from one of said cylindrical members which engage with the inwardly projecting portions to separate the disks as the clutch is opened.

3. In combination, a driving shaft, a driven shaft, clutch members connected with the shafts, one member being axially movable relative to its shaft, series of interlapping disks mounted on the clutch members, means for actuating the axially movable member to open the clutch, and radially disposed devices fixedly mounted on said member to move therewith which positively separate the disks as the clutch opens.

4. In a friction clutch, the combination of cylindrical driving and driven members having series of annular interlapping friction disks of different internal diameters mounted thereon so that the disks of one series project inwardly beyond those of the other series, and means for opening and closing the clutch including a series of devices projecting radially from one of said cylindrical members which engage the inwardly projecting portions of one series of disks in successive order to separate the disks as the clutch opens, there being openings in said projecting portions to permit the devices to pass through certain of the disks to engage others.

5. In a friction clutch, the combination of a driving member, a series of annular disks keyed to slide on said member, a driven member, the two members being movable relatively to each other, a series of annular disks keyed to slide on the driven member which interlap with the disks on the driving member, means for moving the members relatively to each other, and radially disposed projections on one member moving therewith to engage the disks of one series to separate the disks when the clutch is opened.

6. In a clutch, the combination of a driving member having a cylindrical portion, and a series of annular disks keyed to slide on the inside of its cylindrical portion, a driven member having a cylindrical portion located within the corresponding portion of the driving member, and a series of annular disks keyed to slide on the outside of its cylindrical portion, means for moving the driven member into and out of engagement with the driving member, radial projections on the periphery of the cylindrical portion of the driven member which engage the driven disks to separate them from the driving disks when the driven member is moved away from the driving member to open the clutch.

7. In combination, a driving shaft, a driven shaft, a clutch member connected to the driving shaft and having a cylindrical portion, a clutch member movable axially of the driven shaft and having a cylindrical portion located within the cylindrical portion of the driving member, interlapping annular disks mounted on the cylindrical portions of said members, longitudinal guides on the inside of the cylindrical portion of the driven member, and arms secured to the driven shaft and having their ends in sliding engagement with said guides to transmit motion between the shaft and the driven member.

8. In a clutch, the combination of a driven shaft, a driven member movable longitudinally of said shaft, a member on the inner end of the driven shaft which affords a bearing for the inner end of the driven member, a driving shaft, a driving member secured to the latter shaft which is provided with a bearing for the outer end of the driven member, and means for moving the driven member longitudinally.

9. In a clutch, the combination of a driven shaft, a driven member movable longitudinally of said shaft, a bearing on the inner end of the shaft which engages the inside of said member, a driving shaft, and a driving member secured to the latter shaft which is provided with a bearing that engages the outside of the driven member, there being a clearance between the driven shaft and the portion of said member which immediately surrounds it.

10. In a clutch, the combination of a driving shaft, a driven shaft, means for maintaining the driven shaft in a definite longitudinal relation to the driving shaft, a driving member secured to said driving shaft, a driven member mounted for movement axially of the driven shaft, a ball bearing between said members which is arranged adjacent one end of the clutch and is mounted on the driven member to move therewith, said bearing having a sliding support in the driving member, and a second ball bearing between said members arranged adjacent the other end of the clutch.

11. In a clutch, the combination of a driven shaft, a driven member movable longitudinally of said shaft, a cylindrical member on the inner end of the driven shaft, a driving shaft, a driving member secured to the shaft which is provided with a bearing support adjacent the outer end of the driven member, a ball bearing between said cylindrical member and the driving member, a ball bearing between the support and the driven member, means secured to the driven shaft and located between said bearings which has a sliding engagement with the driven member, and means for moving the driven member longitudinally of the shaft.

In witness whereof, I have hereunto set my hand this 12th day of December, 1906.

JOSEPH VOLLMER.

Witnesses:
MAX HAMBURGER,
OSKAR SINGER.